(12) United States Patent
Oda et al.

(10) Patent No.: US 6,680,723 B2
(45) Date of Patent: Jan. 20, 2004

(54) DISPLAY DEVICE

(75) Inventors: Hajime Oda, Chiba-ken (JP); Yoichi Nakano, Chiba-ken (JP); Hiroshi Takahashi, Chiba-ken (JP)

(73) Assignee: Seiko Precision Circuits Inc., Chiba-ken (JP)

( * ) Notice: Subject to any disclaimer, the term of this patent is extended or adjusted under 35 U.S.C. 154(b) by 271 days.

(21) Appl. No.: 09/862,413

(22) Filed: May 21, 2001

(65) Prior Publication Data

US 2001/0052892 A1 Dec. 20, 2001

(30) Foreign Application Priority Data

Jun. 9, 2000 (JP) ........................................ 2000-173991

(51) Int. Cl.[7] ................................................. G09G 3/12
(52) U.S. Cl. ........................................ 345/102; 345/45
(58) Field of Search ........................ 345/102, 80, 205, 345/36, 45, 76; 349/69, 149, 151; 455/347; 315/169.1, 169.2, 169.3

(56) References Cited

U.S. PATENT DOCUMENTS 4,809,078 A * 2/1989 Yabe et al. .................. 348/794
5,265,273 A * 11/1993 Goodwin et al. ............ 455/347
5,847,783 A * 12/1998 Hiramoto et al. ............. 349/69
6,301,098 B1 * 10/2001 Kim ............................ 361/680
2002/0024624 A1 * 2/2002 Takenaka ..................... 349/110

FOREIGN PATENT DOCUMENTS

JP        10133816 A  *  5/1998

* cited by examiner

Primary Examiner—Vijay Shankar
Assistant Examiner—Nitin Patel
(74) Attorney, Agent, or Firm—Jordan and Hamburg LLP

(57) ABSTRACT

Display device designed to prevent surroundings from being adversely affected by noise includes an inner circuit board on which a support frame is mounted in a specific position. A liquid crystal panel is mounted on the support frame and held stationary by a frame. An EL panel for illuminating the liquid crystal panel is mounted behind the liquid crystal panel. An EL circuit board holding an EL driver circuit thereon is bonded to the bottom surface of the EL panel. A shielding plate is mounted on a top surface of the inner circuit board surrounded by the support frame, and is located opposite the EL panel. The shielding plate cuts off noise generated by the EL driver circuit. The EL panel is connected with electrodes on the EL circuit board via lead wires. An electrode on the EL circuit board and an electrode on the circuit board are connected via a contact member. Electric power and control signals are supplied via this contact member.

16 Claims, 5 Drawing Sheets

DISPLAY DEVICE

BACKGROUND OF THE INVENTION

1. Field of the Invention

The present invention relates to a display device using a liquid crystal panel.

2. Description of the Related Art

In some conventional display devices using liquid crystal panels, an EL panel is used as a backlight for a liquid crystal panel a, as shown in FIG. 5. The liquid crystal panel a is connected with electrodes of a circuit board b by an LCD connector. Since the liquid crystal panel a has a large number of pins, a relatively large area is required for wiring. Usually, the wiring is placed under the liquid crystal panel a. Therefore, an EL driver circuit c for driving the EL panel is not placed under the liquid crystal panel a but in a remote position on the circuit board b. Lead wires d are brought out from the EL panel for connection with the EL driver circuit c.

When the EL driver circuit c is placed on the circuit board b remote from the liquid crystal panel a as mentioned above, space must be secured on the circuit board b for this purpose. This makes the circuit board b bulky. Furthermore, the EL panel is driven with a high driving voltage and so a step-up circuit is employed. This results in considerably severe RF switching noise which affects the surroundings from the lead wires d. For example, in the case of an instrument for measuring minute electrical currents such as a photometer, the noise may deteriorate the performance of the instrument. Consequently, the EL panel cannot be placed close to the minute current detection portion or a high-gain amplifier unless any countermeasure is taken. In this manner, limitations are placed on the placement of the EL driver circuit.

When the output voltage from the step-up circuit is coupled to the EL panel by the lead wires d, if the step-up circuit is placed remote from the EL panel, the effect of noise varies according to the manner in which leads are wired. As a result, shielded wires must be used or another countermeasure is necessary. In this regard, there are many problems associated with such arrangements.

OBJECTS AND SUMMARY OF THE INVENTION

It is an object of the present invention to provide a display device free of the foregoing problems.

Accordingly, a display device in accordance with the present invention includes a liquid crystal panel spaced a given or set distance from a circuit board and an EL panel for illuminating the liquid crystal panel located behind the liquid crystal panel. Furthermore, an EL circuit board having an EL driver circuit thereon is located behind the EL panel. In this embodiment, the EL panel and EL circuit board are placed close to each other, and the surroundings are prevented from being adversely affected by noise generated by the EL driver circuit.

The space between the liquid crystal panel and the circuit board is maintained by a support member. Preferably, the liquid crystal panel is held against the circuit board by a holddown frame. This structure facilitates maintaining the spacing between the liquid crystal panel and the circuit board.

Preferably, a shielding plate is mounted on the circuit board and opposite the EL panel to cut off noise produced by the EL driver circuit. This structure can prevent the surroundings from being adversely affected by noise.

It is also desirable that the EL circuit board be electrically connected with the shielding plate. In addition, the EL circuit board is preferably connected via a contact member with power-supply electrodes on the circuit board, the electrodes being exposed from the shielding plate. Moreover, the EL circuit board is preferably connected via the contact member with electrodes used for supplying control signals, the electrodes being exposed from the shielding plate. This structure facilitates making connections and assembling the display device.

Other objects and features of the invention will appear in the course of the description thereof, which follows.

DESCRIPTION OF THE PREFERRED EMBODIMENTS

Figure 1:
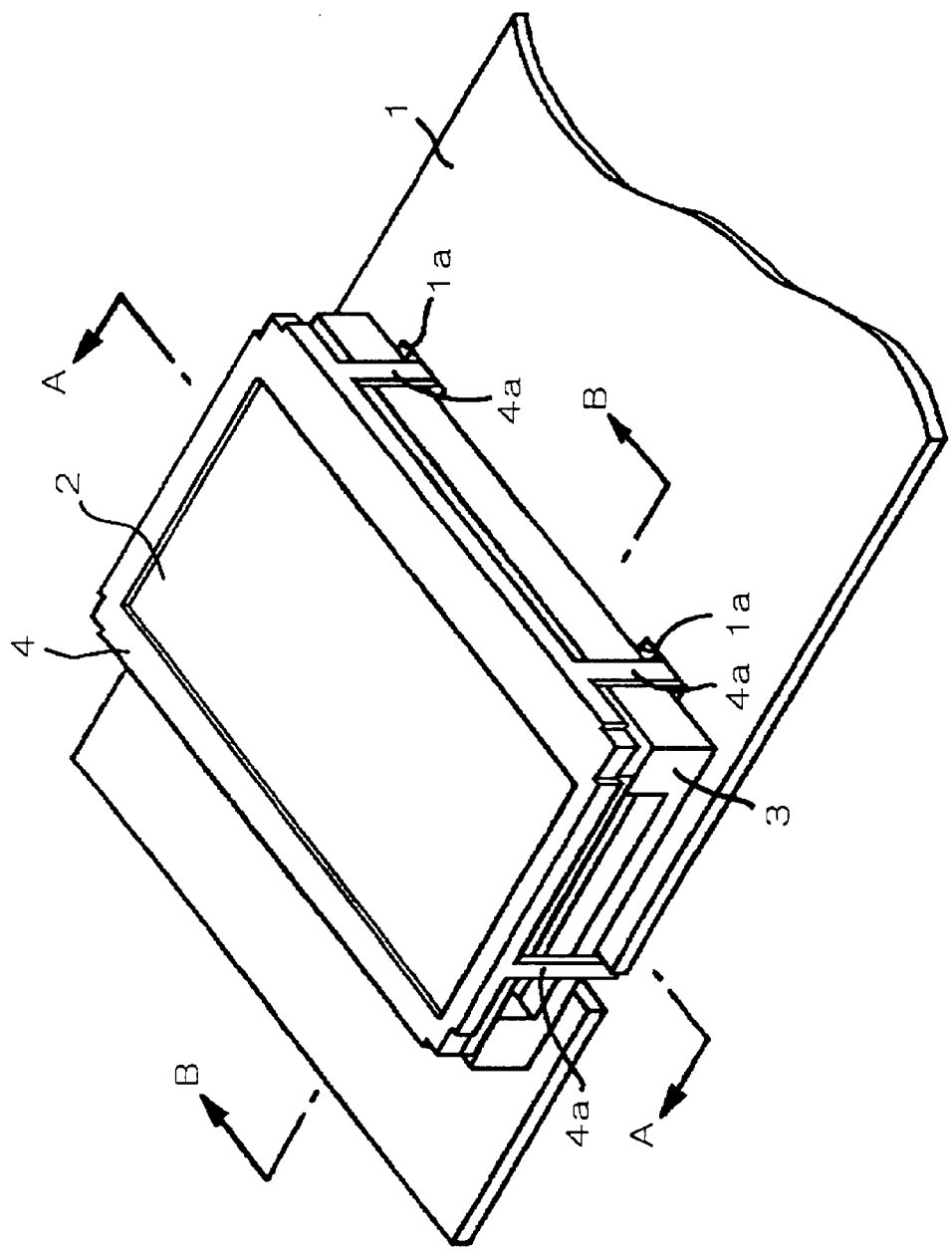
FIG. 1 is a perspective view of a display device in accordance with one embodiment of the present invention.
Figure 2:
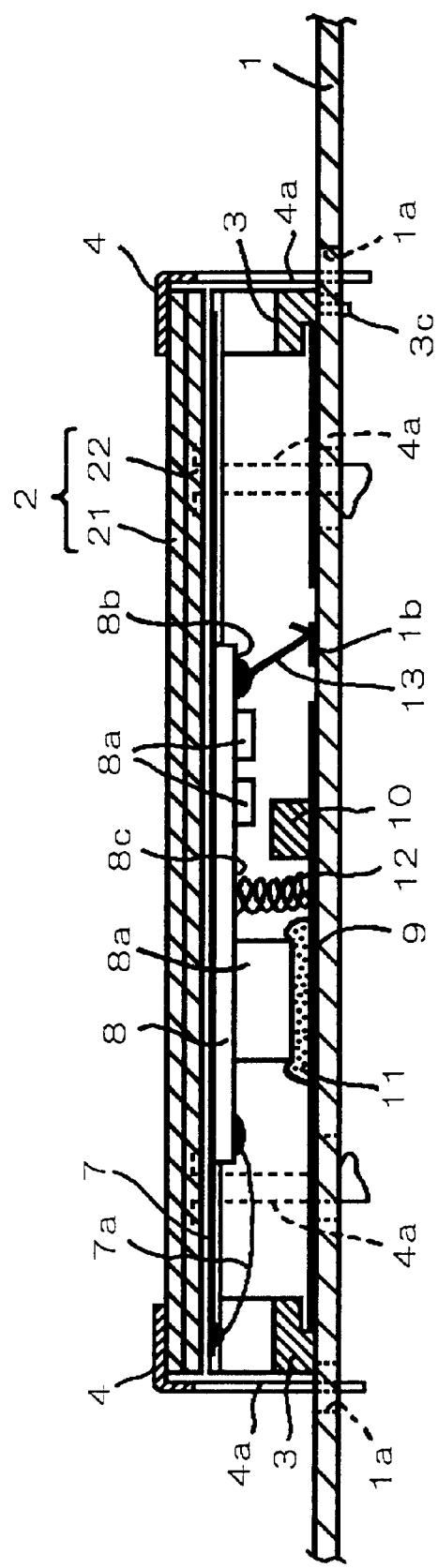
FIG. 2 is an enlarged cross section taken along line A—A of FIG. 1.
Figure 3:
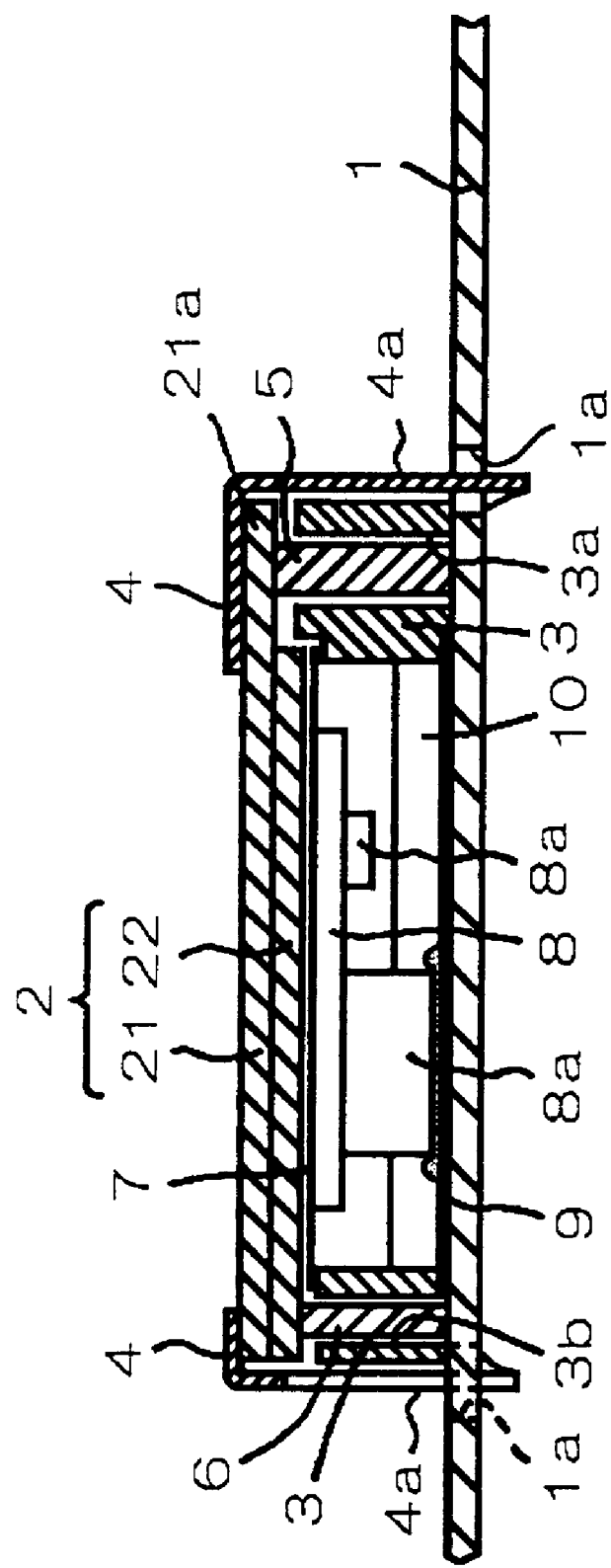
FIG. 3 is an enlarged cross section taken along line B—B of FIG. 1.

Referring to FIGS. 1–3, there is shown a display device in accordance with one embodiment of the present invention. The display device has a circuit board 1 on which a liquid crystal panel 2 is placed via a support frame 3 acting as a support member. The liquid crystal panel 2 is mounted in position by a holddown frame 4. The liquid crystal panel 2 comprises two opposite glass plates or substrates 21 and 22. A transparent electrode made of ITO is formed on the inner surface of each glass plate 21 and 22. An orientation film is formed to cover each transparent electrode. The gap between the electrodes is maintained constant. A liquid crystal material is sealed in between these electrodes. As shown in FIG. 3, the glass plate 21 has one end portion (the right end as viewed in FIG. 3) forming an extraction electrode portion 21a protruding from the glass plate 22.

The support frame 3 is provided with a hole 3a opposite the extraction electrode portion 21a. A connector 5 passes through the hole 3a and is connected with the extraction electrode portion 21a at its top end. The connector 5 is connected at its bottom end with electrodes on the circuit board 1.

The support frame 3 is provided with a hole 3b on the side of the other ends (the left end as viewed in FIG. 3) of the glass plates 21 and 22. Liquid crystal support rubber 6 extends through the hole 3b and holds the liquid crystal panel 2 on the circuit board 1.

As shown in FIG. 2, positioning protrusions 3c protrude from the bottom surface of the support frame 3 and are fitted in positioning holes (not shown) in the circuit board 1. Thus, the support frame 3 is placed in position on the circuit board 1.

Several legs 4a depend from the holddown frame 4. The bottom ends of the legs 4a extend through holes 1a formed in the circuit board 1 (see FIG. 1). The bottom ends of the legs 4a have pawls at their front ends. The pawls are anchored to the bottom surface of the circuit board 1.

An EL panel placement portion for placement of the EL panel 7 is formed on a part of the top surface of the support frame 3. The panel placement portion holds the EL panel 7 to the liquid crystal panel 2 with a gap therebetween. An EL circuit board 8 is adhesively bonded to the bottom surface of the EL panel 7. Circuit elements 8a for the EL driver circuit are connected to the EL circuit board 8. A shielding plate 9 is arranged on the top surface of the circuit board 1 within the interior surrounded by the support frame 3, and is located opposite the EL panel 7. The shielding plate 9 consists of a plastic film having a copper foil on its top surface and is flexible. Ribs 10 hold down the shielding plate 9. A cushion member 11 is interposed between the tall circuit elements 8a and the shielding plate 9.

The EL panel 7 is connected with electrodes on the EL circuit board 8 via lead wires 7a. The EL circuit board 8 has electrodes 8b and 8c. One end of a contact member 13 is connected with the electrode 8b. The shielding plate 9 is partially cut away to expose the electrode 1b on the circuit board 1. The bottom end of the contact member 13 is electrically connected with the exposed electrode 1b. The electrode 1b is an electrode for supplying control signals for turning on and off the EL panel 7 and a power supply including a ground. The electrode 8c and the shielding plate 9 are electrically connected via a coil spring 12. The shielding plate 9 is connected with the ground of the EL circuit board 8. Therefore, the shielding plate 9 is at the same potential as the ground of the board 1.

Because In view of this structure, if a high-voltage driving signal is supplied in when driving the EL panel 7, noise is cut off and prevented from leaking out because the EL circuit board 8 is placed inside the support frame 3 and close to the EL panel 7, and because the shielding plate 9 is placed opposite the EL panel 7.

Since the driving voltage for the EL panel 7 is high, noise is induced in the lead wire 7a for supplying the driving signal to the EL panel 7. This lead wire 7a can be short. Because However, because the shielding plate 9 is arranged inside the support frame 3, the effects of noise on the outside are prevented.

Figure 4:
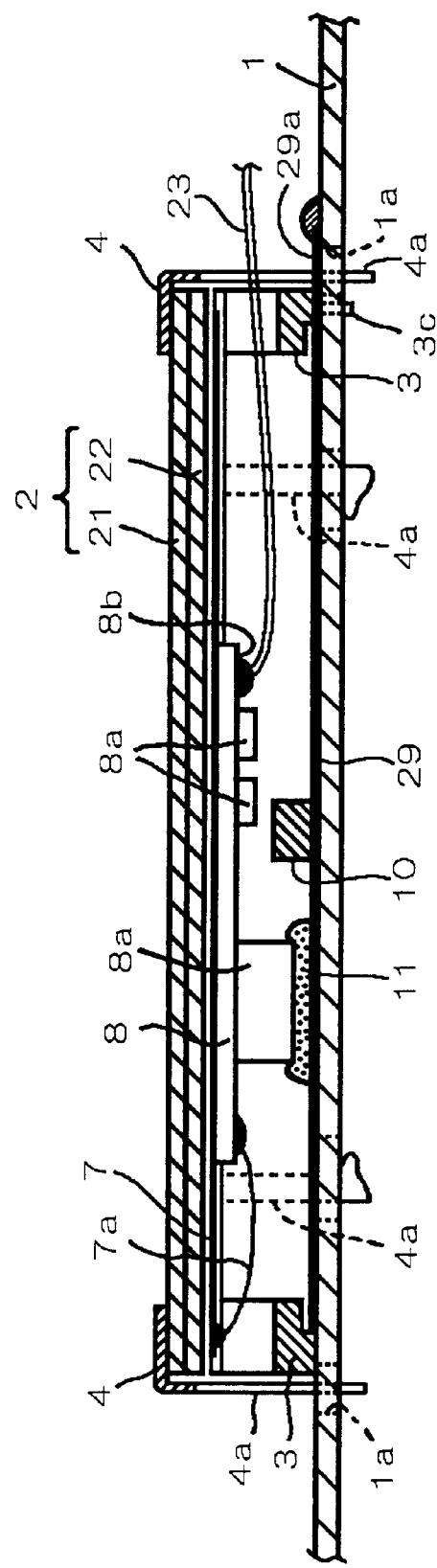
FIG. 4 is an enlarged cross section of a display device in accordance with another embodiment of the present invention.
Figure 5:
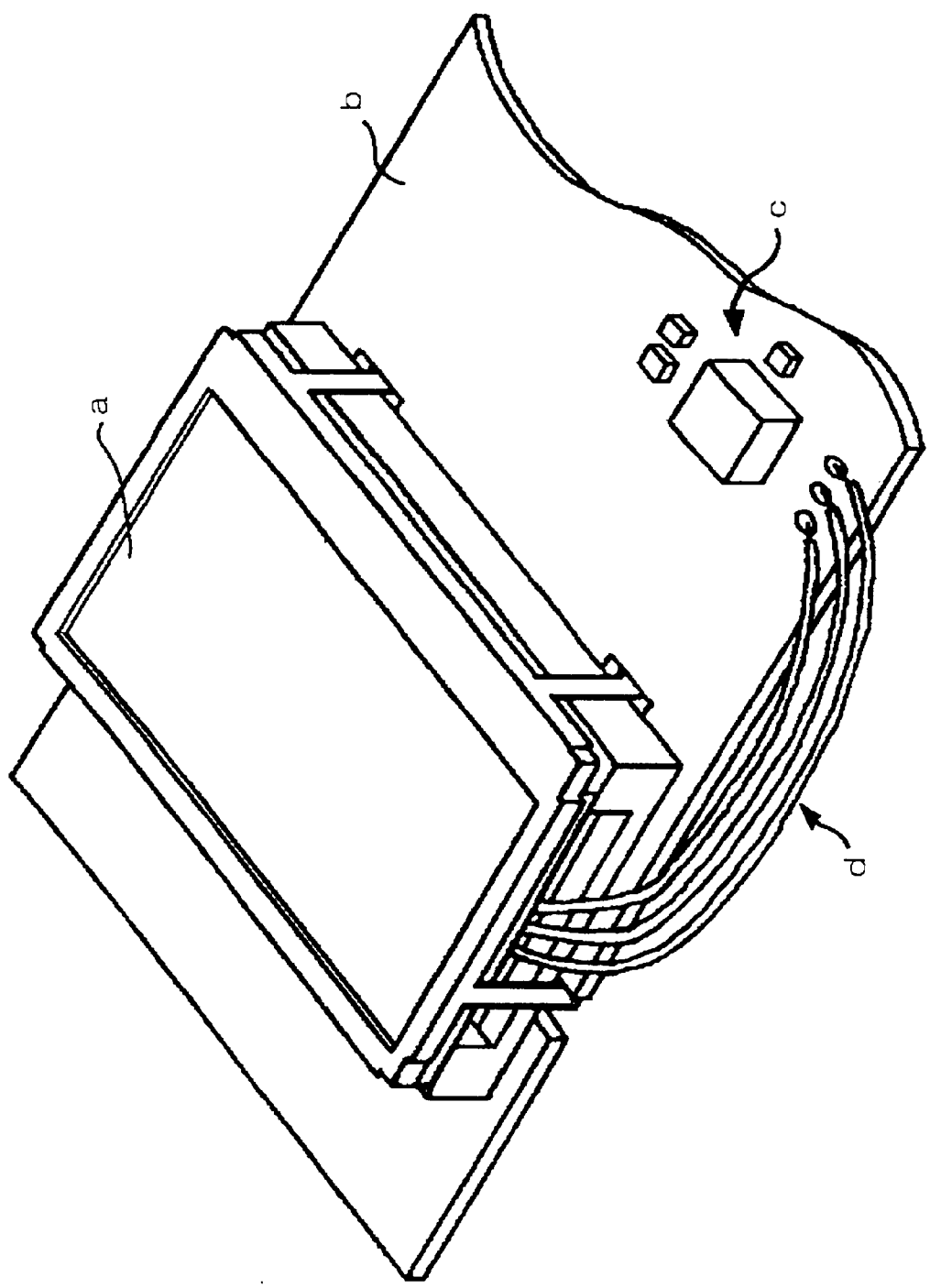
FIG. 5 is a perspective view of a conventional structure.

The EL circuit board 8 uses the contact member 13 to permit electric power and control signals to be supplied via the electrode 8b to the EL circuit board 8. This makes it unnecessary to solder the EL circuit board 8 and the shielding plate 9 to the circuit board 1 which enhances the ability to assemble the device Referring next to FIG. 4, there is shown a display device in accordance with another embodiment of the present invention. This embodiment is similar to the embodiment shown in FIG. 2 except that the coil spring 12 and the contact member 13 are omitted. In particular, the shielding plate 29 is not provided with the cutout to expose the electrode 1b as shown in FIG. 2. Instead, the shielding plate 29 is shaped to cover the entire top surface of the circuit board 1 within the interior surrounded by the support frame 3. One end 29a of the shielding plate 29 extends outwardly from the support frame 3 and is connected with the ground of the circuit board 1. A lead wire 23 is soldered to the electrode 8b of the EL circuit board 8, and the front end of the lead wire 23 is brought out from the support frame 3. The front end of the lead wire 23 is connected with an electrode on the circuit board 1 in a manner not illustrated Electric power and control signals are supplied to the EL circuit board 8 via this electrode. Connection with the ground is made also via this electrode. Note that like components are indicated by like reference numerals in both FIGS. 2 and 4.

Connection lines for supplying electric power and control signals via the electrode 8b produce only a small amount of noise. Therefore, if the lead wire 23 is brought out from the support frame 3, noise will produce little adverse effects.

Because In view of the structure described above, the EL panel is close to the EL circuit board holding the EL driver circuit thereon. Effects of noise can be reduced greatly. Since the EL driver circuit is not mounted on the circuit board, the area of the circuit board can be decreased. Consequently, miniaturization can be accomplished. Furthermore, noise can be cut off by mounting the shielding plate. Hence, the effects of noise can be reduced further.

Additionally, the EL circuit board has a contact member for making an electrical connection. Therefore, the assembly operation can be performed by throwing in parts. As a result, the ease of assembly of the device can be improved.

What is claimed is:

1. A display device comprising:
   a first circuit board;
   a liquid crystal panel superposed at a given set distance from the first circuit board;
   an EL panel for illuminating the liquid crystal panel, the EL panel being located behind the liquid crystal panel;
   a second EL circuit board having an EL driver circuit thereon, the EL circuit board being different than the first circuit board and being located between the EL panel and the first circuit board; and
   comprising a support frame for supporting the liquid crystal display at a set distance from the first circuit board to thereby define a space between the liquid crystal panel and the first circuit board, the EL panel and the EL circuit board being arranged in the space between the liquid crystal panel and the first circuit board.

2. The display device of claim 1, wherein said liquid crystal panel is supported by a support member such that a gap is maintained between said liquid crystal panel and said first circuit board, and wherein said liquid crystal panel is mounted to said first circuit board by a holddown frame.

3. The display device of claim 1 or 2, wherein said first circuit board has a shielding plate located opposite said EL panel to cut off noise produced by said EL driver circuit.

4. The display device of claim 3, wherein said EL circuit board is electrically connected with said shielding plate.

5. The display device of claim 4, wherein said first circuit board has a power supply electrode for a power supply and control signal electrodes for supplying control signals, said power supply electrode and said control signal electrodes being exposed from said shielding plate, and wherein said EL circuit board is connected via a contact member with said power supply electrode and said control signal electrodes.

6. The display device of claim 1, wherein the EL panel is arranged adjacent the liquid crystal panel the EL circuit board is arranged adjacent the EL panel such that the EL panel interposed between the liquid crystal panel and the EL circuit board.

7. The display device of claim 1, wherein the EL circuit board is arranged more proximate the first circuit board than the EL panel.

8. The display device of claim 1, wherein said EL panel is arranged adjacent said liquid crystal panel and said EL circuit board is arranged adjacent said EL panel such that said EL panel is interposed between said liquid crystal panel and said EL circuit board.

9. The display device of claim 1, wherein said EL panel is spaced from said first circuit board, said EL circuit board being arranged in said space between said EL panel and said first circuit board.

10. The display device of claim 1, wherein said EL circuit board is attached to a surface of said EL panel facing said first circuit board.

11. The display device of claim 1, wherein said EL circuit board is adhesively bonded to a surface of said EL panel facing said first circuit board.

12. The display device of claim 1, wherein said EL driver circuit is arranged on a surface of said EL circuit board facing said first circuit board.

13. The display device of claim 1, further comprising a shielding plate arranged on a surface of said first circuit board and opposite and spaced from said EL panel to cut off noise produced by said EL driver circuit.

14. The display device of claim 13, further comprising ribs for holding said shielding plate on said surface of said first circuit board.

15. The display device of claim 13, further comprising a cushion member interposed between circuit elements of said EL driver circuit and said shielding plate.

16. The display device of claim 13, further comprising a coil spring extending in a space between said EL panel and said shielding plate for electrically connecting said EL panel and said shielding plate.

* * * * *